United States Patent [19]

Askew et al.

[11] Patent Number: 5,083,712

[45] Date of Patent: * Jan. 28, 1992

[54] METHOD OF PRODUCING FINE PARTICLES

[75] Inventors: Herbert F. Askew, Turville; Stephen C. Brown, Middlesex, both of England

[73] Assignee: Alcan International Limited, Montreal, Canada

[*] Notice: The portion of the term of this patent subsequent to Feb. 5, 2008 has been disclaimed.

[21] Appl. No.: 620,945

[22] Filed: Dec. 3, 1990

Related U.S. Application Data

[63] Continuation of Ser. No. 470,641, Jan. 26, 1990, Pat. No. 4,989,794, and a continuation-in-part of Ser. No. 216,561, Jul. 8, 1988, abandoned, and a continuation-in-part of Ser. No. 391,628, Aug. 4, 1989, abandoned, which is a continuation of Ser. No. 74,044, Jul. 8, 1987, abandoned.

[30] Foreign Application Priority Data

Jul. 16, 1986 [GB] United Kingdom ............... 8617387
Jul. 9, 1987 [GB] United Kingdom ............... 8716213

[51] Int. Cl.⁵ ............................................. B02C 19/00
[52] U.S. Cl. .................................... 241/16; 241/21; 241/24; 241/29; 241/80
[58] Field of Search ............... 241/80, 97, 21, 24, 241/29, 79, 79.1, 171, 172, 16, 25, 101 B

[56] References Cited

U.S. PATENT DOCUMENTS 4,770,352 9/1988 Takamoto et al. ............... 241/80 X
4,989,794 2/1991 Askew et al. ...................... 241/21

FOREIGN PATENT DOCUMENTS 1178482 9/1985 U.S.S.R. ............................ 241/21

Primary Examiner—Mark Rosenbaum
Attorney, Agent, or Firm—Browdy and Neimark

[57] ABSTRACT

A method of reducing the particle size of solid particles is applicable to the production of very fine particles of a wide variety of solids, including alumina hydrate, and comprises milling a liquid suspension of solid particles in an agitated media mill, pumping the milled suspension through a particle size classification device to separate the slurry into a coarse fraction and a fine fraction, the particles of the coarse fraction having a greater median particle size than the particles of the fine fraction, recycling the coarse fraction from the particle size classification device to the input of the mill, and recycling the fine fraction by pumping it to the classification device, wherein recycling of both coarse and fine fractions are continued until solid particles of the desired reduced particle size are produced. Preferably a single classification device and a single mill can be used, and particles having a median particle size of 0.3 microns or less and a relatively narrow paricle size distribution can be produced, even using a hydrocyclone as the classification device.

25 Claims, 3 Drawing Sheets

METHOD OF PRODUCING FINE PARTICLES

This application is a continuation of parent, co-pending application Ser. No. 07/470,641, filed on Jan. 26, 1990, now U.S. Pat. No. 4,989,794, itself a continuation-in-part of Ser. No. 07/216,561, filed July 8, 1988, co-pending therewith but now abandoned in favor thereof, and a continuation-in-part also Ser. No. 07/391,628, filed on Aug. 4, 1989, now abandoned, which is a continuation of Ser. No. 07/074,044, filed on July 8, 1987, now abandoned. The subject matter of such parent applications is incorporated herein by reference.

This invention relates to a method of reducing the particle size of solid particles and is applicable to the production of very fine particles of a wide variety of solids, including relatively hard solids.

Very fine inorganic particles, of median particle size of 2 microns or less, are used for various purposes. One application of such particles is as a filler material for plastics compositions, for example in filled cable sheathing compounds. Use of fine powders can also accelerate reaction rates in chemical reactions involving a solid reagent and accelerate dissolution of the solid, metallic or ceramic powders of small particle size are used for processing into components, and some solid catalysts are more effective when of small particle size. In many applications a superior solid product, or superior process using the products may be obtained.

Reduction of solid particles, especially of hard materials, to micron and sub-micron size is generally achieved by means of an attrition mill, such as a bead mill, fed with a dispersion of the coarse particles in a liquid (usually water). The milled particles obtained usually have a wide particle size distribution and to obtain a reasonably uniform small particle size the particles obtained have to be classified.

Hydrocyclones are known for dividing a suspension of milled particles into a coarse fraction and a fine fraction, but it has not so far been possible to obtain satisfactory particle size separation for particles smaller than 2 or 3 microns in a single pass through the classifying device. It has been necessary to pass the suspension through a series of classifying devices, which results in an inefficient process having a very poor yield. Furthermore, conventional theory holds that hydrocyclones have little useful separating capacity for particles below about 4 microns, particularly using relatively high slurry loadings.

It has been found, surprisingly, that very efficient separation of particles having a median size of 2 microns or less from larger median size particles and a high overall yield may be obtained by the method of the present invention, which can require for its performance only a single mill and a single classification device, preferably a hydrocyclone, although more than one mill and/or classification device can be used if desired.

According to the present invention, there is provided a method of producing solid particles of reduced median particle size, which comprises milling a liquid suspension of solid particles in a milling stage, pumping the milled suspension through a particle size classification stage to separate the slurry into a coarse fraction and a fine fraction, the particles of the coarse fraction having a greater median particle size than the particles of the fine fraction, recycling the coarse fraction from the particle size classification stage to the milling stage, and recycling the fine fraction to join the output of the milling stage before or during classification wherein recycling of both coarse and fine fractions are continued until solid particles of the desired reduced particle size are produced.

Although the present invention has wide application for a variety of different materials one particularly suitable material is aluminium hydroxide, one form of which is commonly known as ATH. Aluminium hydroxide has a variety of alternative names, its formula may be conveniently represented as $Al_2O_3 \cdot xH_2O$ where x can take values from 1.0 to 3.0 inclusive and "ATH" as used herein encompasses all aluminium hydroxides having such values of x.

Finely divided ATH is used as a "filler" in many materials such as paper, rubber and plastics compositions which find a variety of applications, including cable sheaths, conveyor belts, thermoplastics-mouldings, adhesives and polyvinyl chloride and rubber goods. ATH filler can improve the mechanical and electrical properties of such materials and also acts both as a fire retardant/flame suppressant and as a smoke suppressant.

ATH is generally obtained by the Bayer process for extraction of alumina from bauxite and is contaminated with soda acquired during the extraction process. Some of the soda may be removed by simple washing with water but it is found that not all the soda is removed and the residual soda has an effect on the properties of the ATH.

In many applications relatively coarse grades of ATH (having a particle size exceeding 5 microns) find use. However, there are a range of applications, notably filled elastomers, where ATH of a finely divided form is required. The prior art has evolved precipitation processes for making ATH with surface areas of about 4-12 $m^2g^{-1}$ and average particle sizes of about 2-0.5 microns. Alternative methods of producing finely divided ATH include milling in, for example, stirred media mills or jet micronisers. These prior art methods have the disadvantage that whilst desired surface area may be readily achieved, the processes give a product of wide particle size distribution which may even be bimodal. A wide particle size distribution can have deleterious effects on filled polymer mechanical properties.

It has been found that the present invention is particularly suited to producing milled particles having a relatively narrow particle size distribution. With the method of the present invention, alumina hydrate particles can be obtained having either:

(a) a surface area from 2 to 15 $m^2/g$, a polydispersity not exceeding 0.3 and a content of soluble soda not exceeding 0.02%; or (b) a surface area above 15 $m^2/g$ and a polydispersity not exceeding 0.35; or (c) a surface area of at least 2 $m^2/g$ and a polydispersity not exceeding 0.35.

Polydispersity can be measured in a number of different ways, but for the purposes of the present invention it is based on the light scattering analysis technique utilised in the Model 4600 and 4700 series photon correlation spectroscopes manufactured by Malvern Instruments Limited of Malvern, England. In this technique a scattered light auto-correlation function is generated and a cumulant analysis performed thereon. Polydispersity is then defined as being equal to the normalised second moment of this cumulant analysis. The details of this method are given below.

Particles referred to in paragraphs (b) and (c) above may have soluble soda contents not exceeding 0.02%. ATH particles can be produced having soluble soda contents not exceeding 0.01% or even not exceeding 0.005%.

The surface areas given herein are as measured by the standard Strohlein method as described in "Particle Size Measurement", p. 390, Terence Allen, Chapman & Hall Ltd. 1975.

The soluble soda content is the amount of sodium (expressed as weight percent sodium oxide) that is readily extracted from the ATH by excess water. This "soda" resides on or very near the particle surfaces and is distinctly more able to adversely affect the ATH properties and those of a filled polymer than sodium entrapped within the body of the particles.

The soluble soda content is estimated by subjecting the ATH to extraction with deionised water, passing the solution obtained through a flame and measuring the intensity of the light, at a wavelength characteristic of sodium, emitted by the flame.

The agitated media mill may be of known type and may be a stirred media mill in which milling media, such as ceramic balls or rods typically of size 0.5 to 3.0 mm are agitated by means of a rotating shaft. The shaft may be provided with agitating discs. Alternatively the mill may be a vibro energy mill in which the milling medium is agitated by vigorous movement of the milling chamber. In all cases the milling medium reduces the average particle size of the solid by attrition. The mill is preferably of a type allowing continuous operation, in which the slurry can be continuously fed into the mill, generally pumped into the mill under pressure, and continuously removed at one or more points.

The classification device used may be a continuous centrifugal device or a hydrocyclone which allow particle size classification of the solid suspended in the slurry. A suitable hydrocyclone typically has a maximum internal diameter up to 10 cm.

The recycled fine fraction can mix with the output of the milling stage at any point between the mill itself and the classifier. Indeed it is possible to feed the milled particles and the recycled fine fraction separately into the classifier so that they are mixed and classified together. This mixing can be considered as a suspension blending stage.

The concentration of solid in the slurry may vary widely and would normally be within the range of 5% to 65%, preferably 35% to 50% by weight. The preferred concentration generally depends on the use to which the milled slurry is to be put. A high concentration is normally favourable when the slurry is to be dried to produce a dry solid. A viscosity modifier can be added if desired. For an aqueous slurry of ATH appropriate viscosity modifiers are usually selected from the family of anionic polyelectrolyte dispersants commercially available, for example certain types of sodium polyacrylate. For non-aqueous slurries other types of viscosity modifier are chosen. Whilst not wishing to be limited to any particular theory it is believed that an ionic viscosity modifier such as sodium polyacrylate ionises in the aqueous suspension and the negatively charged ions produced are adsorbed on the surface of the fine particles produced which are positively charged. The adsorbed ions tend to disperse the particles by steric hindrance and ionic repulsion, thus avoiding formation of aggregates of fine particles which tend to trap the liquid of the suspension by occlusion. The concentration of viscosity modifier in the suspension may vary from 0 to 10.0% by weight on the concentration of the fine particles, depending on the desired viscosity of the suspension.

In one method according to the invention the milled suspension discharged from the mill and the fine fraction discharged from the classification device are both conducted to a receptacle for receiving the desired milled product and the contents of the receptacle are recycled to the input of the classification device by a pump intermediate the receptacle and the classification device. In this embodiment the suspension may be pumped from a container for the initial unmilled suspension, passed into the mill at a typical pressure of up to 20 psi, and discharged to the receptacle where it is not under pressure. When a hydrocyclone is used the pump intermediate the receptacle and hydrocyclone may feed the contents of the receptacle to the hydrocyclone at a typical pressure of 50 psi. The coarse fraction is discharged to the container for starting material, and the fine fraction discharged to the receptacle, at substantially zero gauge pressure. As the suspension is repeatedly recycled through the apparatus the median average size of the particles obtained in the receptacle is reduced, and the larger particles eliminated by attrition, so that after a certain time the suspension may have a substantially uniform particle size which is very small.

In another embodiment of the invention the suspension discharged from the mill is conducted, not to the final receptacle for the product, but to an intermediate reservoir, and the contents of the reservoir are pumped to the classification device, from which the coarse fraction is recycled to be passed again through the mill and the fine fraction is delivered to the receptacle. The fine fraction from the receptacle is brought, for example by pumping, to the reservoir so that the fine fraction is recycled through the classification device together with the suspension discharged by the mill. Control of the process of this embodiment is more complex than for the embodiment described above, but the efficiency of the process is greater as only the fine fraction from the classification device is discharged to the receptacle in which the desired suspension of finely divided product eventually accumulates.

In a further embodiment, instead of pumping the suspension to be treated through the mill under positive pressure the suspension is aspirated through the mill by a pump arranged between the mill and the classification device, the pump feeding the milled suspension from the mill to the classification device under positive pressure. With this arrangement the pump can feed the milled suspension to a hydrocyclone at the desired relatively high pressure, typically about 50 psi, and the pressure difference across the mill may approach atmospheric pressure (about 15 psi) which may be sufficient to allow efficient operation of the mill. The coarse fraction from the classification device is again recycled to pass through the mill and the fine fraction, discharged to the receptacle, may be returned to the feed line for the classification device at a point between the mill and the pump, so that the pump aspirates the suspension from the receptacle also. With this arrangement only one pump is required to operate the process. In a variant of this embodiment, a further pump is provided to pump the fine fraction from the receptacle to the line feeding the classification device, the fine fraction from the receptacle being delivered to the classification device feed line at a point between the classification device and the pump feeding suspension from the mill to the device. In this variant the efficiency of the mill may be increased as the pump aspirating suspension through it does not have the additional function of aspirating the fine fraction from the receptacle.

The mill used in the method of the invention may be a bead mill of the known "Eiger" type, loaded with zirconia beads of diameter about 0.8 mm. The classification device may be a hydrocyclone of a known type, such as the "Mozley" hydrocyclone.

After milling further processing can be performed. For example with ATH the suspension may be treated by ion exchange to reduce its content of soda using a known ion-exchange agent such as Duolite C255H+ manufactured by Diamond Shamrock in the form of beads to exchange sodium for hydrogen ions. The ion exchange may be carried out simply by allowing the suspension to stand in contact with the ion-exchange agent, whereupon the pH value of the initially alkaline suspension decreases as the sodium ions in the suspension are adsorbed by the ion-exchange agent and replaced by hydrogen ions. An excess of ion exchange agent over the amount theoretically required may be used to accelerate the reaction and the mixture of suspension and ion exchange agent may be stirred continuously or at intervals. Typically, 10 liters of beads of ion-exchange agent may be used per 100 liters of beads of suspension containing 70% weight/volume of ATH. The progress of the ion-exchange treatment may be monitored by observing the pH of the suspension. The initial pH is of the order of 10 and as the sodium ions are removed the pH falls to below 7, generally to about 5.

It has been found that when sodium polyacrylate is present during the milling step and carried over to the ion-exchange step, the viscosity of the suspension during ion exchange rises to a maximum at a pH of about 7 and then falls as the pH decreases further. It is believed that during ion exchange the sodium polyacrylate is converted to a polyacrylic acid which also acts as a dispersant. Other anionic polyelectrolytes have been found to behave in a similar manner.

The coarse ATH feed to the milling process typically has a soluble soda content of about 0.01%. During milling the soluble soda increases through release of sodium hitherto trapped within the body of the ATH particles. Sodium can also be added to the system as an impurity in the liquid component of the slurry (e.g. mains water) and from the viscosity modifier. Additional methods can be used to limit this soda level, for example ATH feed of low total soda may be used and non-sodium based viscosity modifiers can be chosen. However, the low final level of soluble soda achieved by the ion exchange method is in practice largely independent of these additional refinements. Typically the product of the milling process contains in excess of 0.1% soluble soda. The ion-exchange treatment after milling can readily reduce the soluble soda content to a value below 0.02% and generally below 0.01%.

After milling, and optionally further processing such as ion-exchange treatment, the suspension can be dried by conventional methods. Spray drying may be used to yield a dry powder having good powder flow properties, low "dustiness" and a high bulk density.

The particulate ATHs produced in accordance with the invention have a number of desirable properties. Their small size and narrow size distribution make them very suitable for use as fillers in moulded thermoplastic articles, cable sheaths and other plastics articles. When used as fillers they can give the articles concerned better tensile properties than known ATH fillers. It has been found that the tensile and tear strength obtained can be further improved when a viscosity modifier is added to the suspension during milling. The product when incorporated into polymers shows much less water pick-up from immersion in water or a humid atmosphere than known ATH products and this improvement is especially important when the product is used as a filler for electrical components, as in cable sheaths. It has been found that the fire resistance of flammable products containing the product of the invention as a flame retardant is greater than for other ATH products at the same weight percent loading.

Method of reducing the median particle size of particles according to particular embodiments of the invention will now be described with reference to the accompanying drawings in which.

Figure 1:
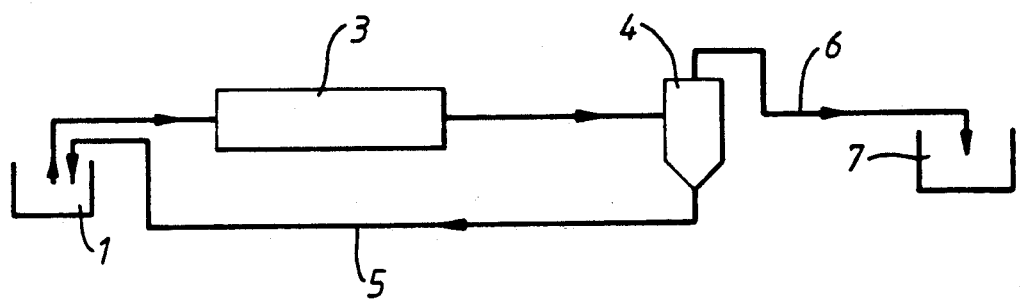
FIG. 1 is a flow diagram showing a method according to the prior art.

In the prior art arrangement of FIG. 1 a liquid slurry of particles to be treated is fed from a container 1 to a bead mill 3 which grinds the slurry and discharges the ground slurry to hydrocyclone 4 which separates it into a coarse and a fine fraction. The coarse fraction is returned through line 5 to container 1 for recycling through the mill and hydrocyclone and the fine fraction is delivered through line 6 to receptacle 7.

It is found that the method of FIG. 1 is incapable of producing a fine fraction having a very low average particle size, as the slurry delivered to receptacle 7 still has a high proportion of relatively coarse particles. When a slurry of solid particles is treated with this arrangement it has not been found possible to obtain a fine fraction of median particle having a size of 2 microns or less.

Figure 2:
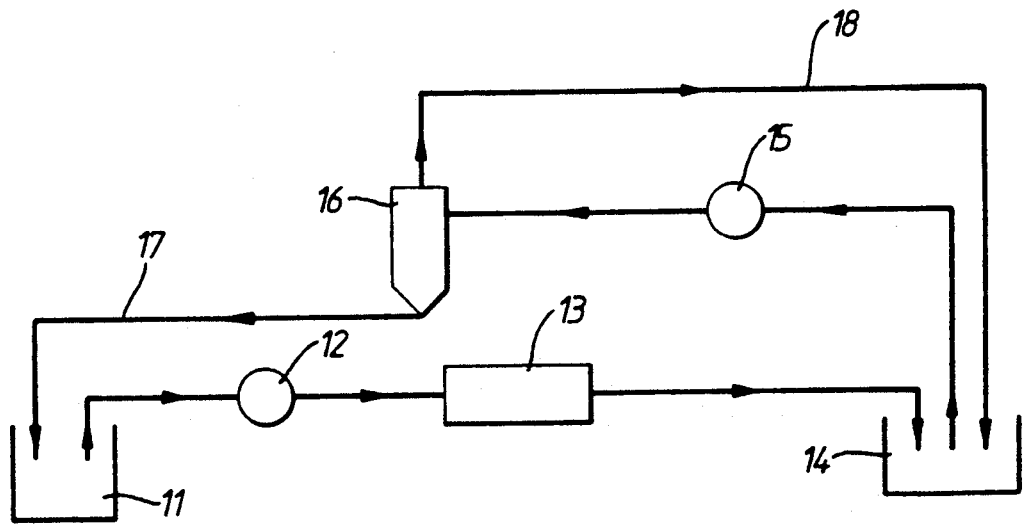
FIGS. 2-5 are flow diagrams of methods according to the invention.

In the arrangement of FIG. 2, the slurry containing the solid particles is fed from container 11 to pump 12 which delivers the slurry at a pressure of up to 20 psi to the input of bead mill 13, which is of the type described below with reference to FIG. 6. The slurry is ground in the mill and discharged to receptacle 14.

The slurry in receptacle 14 is then fed to pump 15 which feeds it at a pressure of about 50 psi to hydrocyclone 16, which separates the slurry into a coarse fraction which is returned by line 17 to container 11, and a fine fraction which is sent by line 18 to the receptacle 14.

When the embodiment of FIG. 2 is used, a batch of slurry is supplied, one half to container 11 and the other half to receptacle 14, and the pumps, mill and hydrocyclone are run until the median particle size of the product batch which accumulates in receptacle 14 has the desired value.

The method described with reference to FIG. 2 allows the mill to be operated under favourable grinding conditions, that is with a slurry having a relatively high solids content (up to 65% by weight) and a high flow rate. The slurry is fed to the mill under positive pressure. The rate of flow is easily adjusted by adjusting the rate of operation of pump 12 so that the rate of flow of the slurry through the mill is matched to the requirements of the hydrocyclone. Pump 15 may be used simply to maintain the feed pressure for hydrocyclone 15;

thus the method is simply controlled by adjusting pump 12 according to the respective levels of the slurry in container 11 and in receptacle 14. When operated with an aqueous slurry of a solid particles the method is capable of yielding particles of a median particle size of 0.3 microns or less, using only one mill and only one hydrocyclone.

Figure 3:
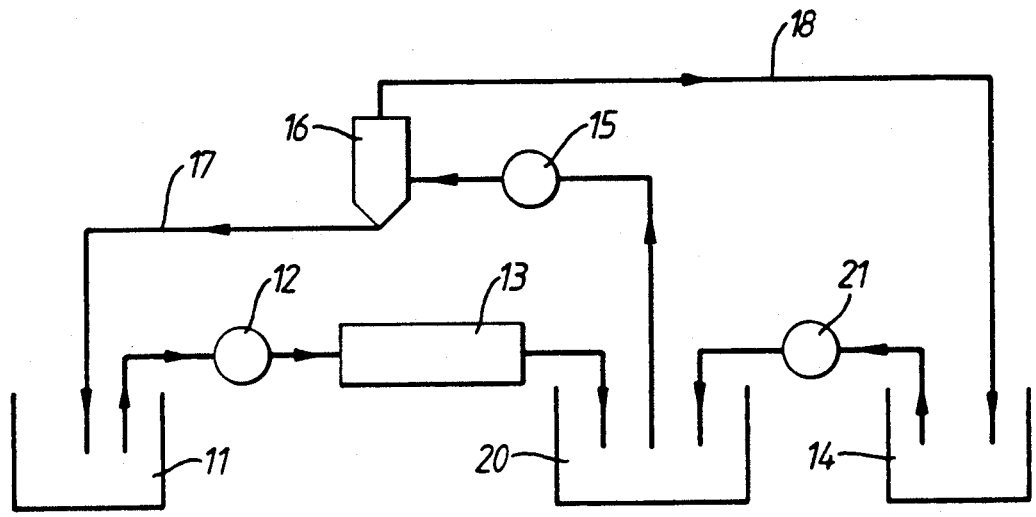

The method illustrated by FIG. 3 is similar to that of FIG. 2 and common components are shown by the same reference numerals. Pump 12, mill 13, pump 15, and hydrocyclone 16 operate in the same way as in FIG. 2 and the coarse fraction from the hydrocyclone is again recycled to container 11 through line 17, the fine fraction being delivered to receptacle 14 through line 18. However in this arrangement the output of slurry from the mill 13 is fed not to receptacle 14, but to a reservoir 20 from which it is fed by pump 15 to the hydrocyclone 16, and a further pump 21 returns the fine fraction from receptacle 14 to reservoir 20.

This arrangement is more complex than that of FIG. 2 in that an extra container (reservoir 20) is required and an extra pump (21) is needed to transfer the fine fraction from receptacle 14 to the reservoir 20. However the efficiency of this embodiment is rather greater as the coarse fraction from the mill 13 is fed to the hydrocyclone 16 without passing through the receptacle 14 which receives the fine fraction.

Figure 4:
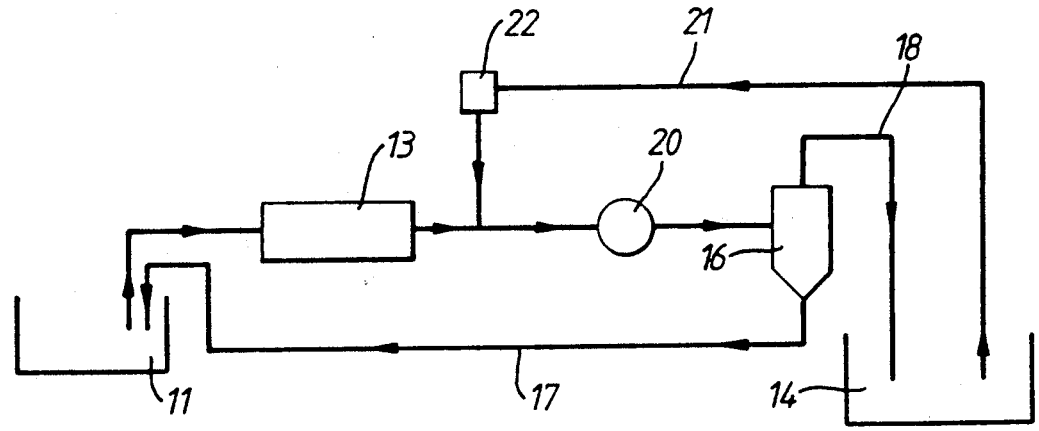

FIG. 4 shows an arrangement in which only one pump is required. In this case the slurry from container 11 is again fed to bead mill 13 and passes from the mill 13 to hydrocyclone 16 which divides it into a coarse fraction which is returned to container 11 through line 17 and a fine fraction which is sent through line 18 to receptacle 14. However in this case a single pump 20 both delivers the slurry to the hydrocyclone 16 at a pressure of about 50 psi and draws the slurry through mill 13 by suction.

The pressure difference urging the slurry through mill 13 is thus generated by aspiration by pump 20 and it may correspond substantially to atmospheric pressure, that is about 15 psi. If a higher input pressure for the mill 13 is required, container 11 may be a closed tank and the tank may be pressurized. In this arrangement the slurry discharged to receptacle 14 is recycled through line 21 to a point between mill 13 and pump 20, and the slurry is drawn through line 21 by the aspiration of the pump 20. A valve 22 is inserted in line 21 to control the rate of recycling of the slurry from receptacle 14 and the process is controlled by adjustment of pump 20 and valve 22 as required.

Figure 5:
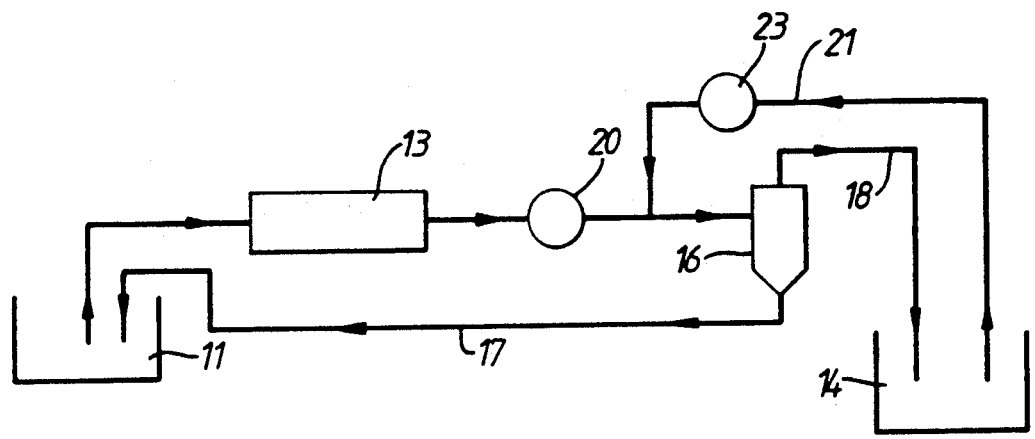

FIG. 5 shows a variant of the process of FIG. 4. In this variant the slurry is again aspirated through mill 13 and fed to hydrocyclone 16 by pump 20, the coarse fraction is again recycled through line 17 and the fine fraction of the slurry is recycled from receptacle 14 to the hydrocyclone 16. However in this instance line 21 returns the fine fraction to a point between the pump 20 and the hydrocyclone 16 and is impelled by a further pump 23 provided in line 21. Pump 23 delivers the recycled fine fraction to the hydrocyclone 16 at a pressure of about 50 psi and the process is controlled by adjusting both pumps 20 and 23. This variant allows pump 20 to aspirate slurry from container 11 through mill 13 more efficiently.

In all the arrangements of FIGS. 3, 4 and 5 all the material present in receptacle 14 has been passed through the hydrocyclone at least once, and in practice often many hundreds of times, thereby increasing the overall efficiency of the process. When starting up, the suspension to be treated is generally divided up equally between the various containers and receptacles.

Figure 6:
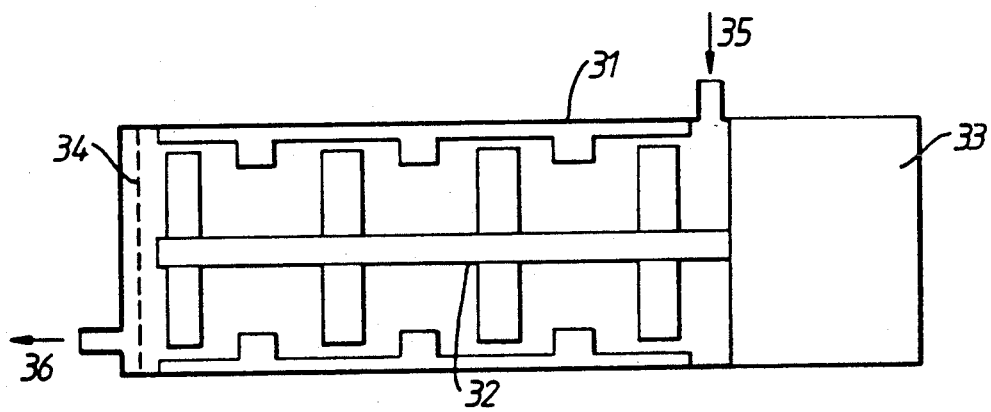
FIG. 6 is a diagram of a bead mill which may be used in the invention.

One type of attrition mill which may be used is the "Eiger" bead mill shown diagrammatically in FIG. 6. The mill comprises a tubular vessel 31 containing an agitator 32 comprising paddles extending radially from a shaft which is driven in rotation by motor 33. The vessel contains a screen 34 to prevent discharge of gross oversize particles from the mill and the vessel contains, around agitator 32, beads of hard material which grind the liquid suspension. The suspension is fed into the mill at inlet 35, the suspension passes through the mill and is discharged at 36 after passing through the screen 34.

It has been found, surprisingly, that when a slurry is milled and classified by the methods described above the classification device can yield a fine fraction of narrow particle size distribution down to a very small average particle size, down to 0.4 microns or even lower. With hitherto known milling and classifying methods, a hydrocyclone classifying device does not produce any useful separation of particle size fractions at particle sizes as small as this.

The invention may be applied to a very wide variety of solids which may be slurred with a wide range of liquids. Solids which may be milled include ATH, iron oxide, talc, silica and other minerals like chalk, zinc oxide, boric oxide, borax, zinc borate, pigments, carbon black, various metals, solid organic compounds, e.g. terephthalic acid, and mixtures thereof. The liquid may be chosen from water, volatile non-aqueous liquids such as hydrocarbons, tetrahydrofuran, dioxan, alcohols and esters, and non-volatile solvents such as phthalates, polyvinylchloride plastisols and waxes. Non-volatile liquids may be used when the slurry is to be used subsequently in liquid form, without drying, for example as plastisols or in certain pharmaceutical preparations. The slurry may include one or more additives to aid milling, such as a dispersant, or to assist later processing, for example a stearate which forms a coating on the particles.

Possible applications for the milled solid include ceramics, catalysts, plastics fillers, fire/flame retardants, smoke supressants and powder metallurgy.

In the methods mentioned above the classification device may be operated continuously or it may be operated intermittently to give quasi-continuous operation, so as to balance the flow of coarse fraction from the classification device with the mill input. The overall process is generally operated as a batch process, i.e. with 100% recycle of both coarse and fine particle fractions since generally the efficiency of the separation device is too low for continuous operation to yield particles of the desired average particle size and breadth of particle size distribution.

The method of the invention may be operated at a range of temperatures according to the nature of the solid and/or liquid being processed. An operating temperature down to $-20$ C. is generally feasible.

EXAMPLE 1

49.5 kg of zinc borate (crystalline form 2335) available from U.S. Borac were dispersed into 150 liters of water. This material had a median particle size of 6 microns. It was processed in accordance with the preferred process of this invention as shown diagramatically in FIG. 2 for three hours. The grinding device was a 20 liter capacity "Eiger" bead mill and the classification device was a "Mozley" hydrocyclone of 2 inch (5.08 cm) nominal diameter.

After three hours the product taken from receptacle 14 was then analysed using the "Malvern" laser photon correlating spectrometer and was found to have a median particle size of 0.28 microns and a polydispersity of 0.23.

EXAMPLE 2

50 kg of terephthalic acid available from ICI were dispersed into 100 liters of water ans milled as Example 1 above for a total of 15 hours. In order to maintain a working viscosity during grinding a further 400 liters of water were added at intervals during the 15 hours together with 2 liters of "Teepol" surfactant available from Shell. The feed material prior to grinding had a specific surface area of 0.18 $m^2/g$ as determined by the standard Strohlein method as described in "Particle Size Measurement", p. 390, Terence Allen, Chapman and Hall Ltd. 1975, a median particle size of 83 microns as determined by Coulter counter, and a particle size mode of 90 microns as determined by Coulter counter. After completion of grinding the product taken from receptacle 14 had a surface area of 3.9 $m^2/g$, a median particle size of less than 1.2 microns, and particle size mode of 1.1 microns as evaluated by the same methods.

In the following Examples the milling of ATH will be described. In these Examples the soluble soda content of ATH is measured as described above.

The average particle size and the polydispersity of the ATH particles were measured by the method described above using a Model 4700 series laser photon correlator supplied by Malvern Instruments Ltd. In this method a very dilute suspension of the particles in water is formed, a number of pulses of light from a laser are passed through the suspension, a detector placed at an angle to the pulse emitted by the laser detects the light reflected from the particles, and the light received by the detector is analysed using a digital analyser to derive a magnitude which is a function of the Brownian motion of the particles, and hence of their mass. The digital analyser presents the results obtained as (1) the average particle size (that is the diameter of the average particles represented as a sphere) and (2) the polydispersity of the suspension (that is, a measure of the width of the particle size distribution, a higher polydispersity indicating a wider size distribution). The surface area of the particles is measured using the standard Strohlein method.

The water pick-up properties of the ATH filled polymers are measured by an appropriate test method for example that of the U.K. Naval Engineering Standard NES 518.

Mechanical properties (tear strength, tensile strength and elongation at break) are measured according to International Standards ISO 37 and ISO 34.

Fire retardant properties are measured by recording the critical oxygen index (COI) according to British Standard BS 2782.

EXAMPLE 3

ATH derived from the Bayer process, having an average particle size of about 50 microns and a free soda content in excess of 0.01% by weight is suspended in water to give a suspension of 700 g/l concentration. A sodium polyacrylate viscosity modifier is added to the suspension in an amount of 2.5% by weight of the ATH.

The suspension is milled by passing it through a stirred media mill of known type loaded with ceramic beads, passing the suspension discharged from the mill through a continuous classification device to divide the suspension into a coarser fraction and a finer fraction, recycling the coarser fraction to the mill and recycling the finer fraction to the classification device. Milling with recycling is continued until the desired surface area of the ATH particles is obtained.

After milling the suspension is charged into a vessel containing 10 liters per 100 liters of suspension of Duolite C255H+ ion-exchange beads capable of exchanging sodium for hydrogen ions. The suspension is allowed to remain in contact with the beads, with occasional stirring, and the pH of the suspension is monitored using a pH meter. When the pH has fallen to a steady value, below pH 7, the suspension is removed from the beads by filtration and spray dried.

Different batches of ATH are treated in this way, the milling being continued for different periods to produce different average particle sizes. The properties of the products obtained are given in Table 1, with the properties of known ATH powders for comparison. In Table 1 samples A1, A2 and A3 are ATHs according to the invention. Samples B1 and B2 were prepared by the milling method but without continuous classification or ion exchange.

TABLE 1

| Sample | Surface Area ($m^2/g$) | Polydispersity | Soluble Soda Content (% $Na_2O$ by wt.) |
| --- | --- | --- | --- |
| A1 | 25 | 0.30 | 0.01 |
| A2 | 25 | 0.30 | 0.22 |
| A3 | 45 | 0.34 | 0.02 |
| B1 | 24 | 0.38 | 0.2 |
| B2 | 45 | 0.40 | 0.11 |

The above data demonstrates the combination of reduced soluble soda content and narrower particle size distribution afforded by the process of this invention.

In order to test the mechanical properties of thermoplastics filled with the ATH, a conventional thermoplastic composition prepared from 10% or ethylene-vinyl acetate copolymer, 40% of polyethylene and 50% of ethylene-propylene diene monomer is filled with 150 parts per 100 of ATH, the filled composition is formed into a body and its mechanical properties measured. The results obtained using sample A1 and sample C1, a precipitated ATH of the prior art having a surface area of 7 $m^2/g$ are summarised in Table 2.

TABLE 2

| Sample | Tear Strength (KN/m) | Tensile Strength at break (MPa) | Elongation at break (%) |
| --- | --- | --- | --- |
| A1 | 19.3 | 3.6 | 140 |
| C1 | 6.7 | 3.3 | 55 |

The fire retardant performances of the composition described above containing sampes A1 and C1 are tested according to BS 2782 and the results are as follows:

TABLE 3

| Sample | Critical Oxygen Index |
| --- | --- |
| A1 | 31.8% |
| C1 | 29.3% |

EXAMPLE 4

The process described in Example 3 is used to prepare ATH material of Strohlein surface area 7 m$^2$/g; no viscosity modifier is added. This material, sample D1 is contrasted in Table 4 with material of the prior art, sample C1, described in Example 3.

TABLE 4

| Sample | Surface Area (m$^2$g) | Soluble Soda (%) |
|---|---|---|
| C1 | 7 | 0.030 |
| D1 | 7 | 0.002 |

We claim:

1. A continuous method of producing solid particles of material of reduced median particle size no greater than 2 microns, which method comprises:
   milling in a milling stage a liquid suspension of solid particles of said material,
   feeding the milled suspension to a suspension blending stage,
   classifying in a classifying stage the blended suspension to separate the blended suspension into a coarse fraction and a fine fraction, the particles of the coarse fraction having a greater median particle size than the particles of the fine fraction,
   recycling the coarse fraction back to the milling stage,
   recycling the fine fraction back to the suspension blending stage, and
   continuing recycling of both coarse and fine fractions with only a minor amount of the fine fraction being taken off as product solid particles of said desired reduced particle size no greater than 2 microns.

2. A method according to claim 1 in the form of a semicontinuous process wherein recycling of both coarse and fine fractions are continued with essentially no product being drawn off until solid particles of the desired reduced particle size are produced and thereafter drawing off the product.

3. A method according to claim 1 wherein recycling of both coarse and fine fractions are continued until product solid particles of a polydispersity not exceeding 0.35 are produced.

4. A method according to claim 2 wherein recycling of both coarse and fine fractions are continued until product solid particles of a polydispersity not exceeding 0.35 are produced.

5. A method according to claim 1 in which the particle size classification is carried out in a hydrocyclone.

6. A method according to claim 5, in which the milled suspension and fine fraction are pumped to the suspension blending stage for intermittent periods such that over a period of time the flow from the coarse fraction of the classification stage balances the flow through the milling stage.

7. A method according to claim 6, wherein the slurry contain from 35 to 50% by weight of solid.

8. A method according to claim 5, in which the slurry contains from 5 by weight of solid.

9. A method as claimed in claim 5, in which a single milling stage is used.

10. A method according to claim 1 in which the milled suspension and fine fraction are pumped continuously to the suspension blending stage.

11. A method according to claim 10, in which the slurry contains from 35 to 50% by weight of solid.

12. A method according to claim 1, in which the milled suspension and fine fraction are pumped to the suspension blending stage for intermittent periods such that over a period of time the flow of the coarse fraction from the classification stage balances the flow through the milling stage.

13. A method according to claim 12, wherein the slurry contains from 5 to 65% by weight of solid.

14. A method according to claim 1, in which the milled suspension discharged from the milling stage and the fine fraction discharged from the classification stage are both conducted to a receptacle for blending and the contents of the receptacle are pumped to the inlet of the classification stage.

15. A method according to claim 1, in which the milled suspension discharged from the milling is conducted to a reservoir for blending, the fine fraction discharged from the classification stage is conducted to a receptacle, the contents of the receptacle are conducted to the reservoir, and the contents of the reservoir are pumped to the input of the classification stage.

16. A method according to claim 1, in which the milled suspension discharged from the milling stage is pumped to the classification stage by a pump intermediate the milling stage and the classification stage, the suspension is aspirated through the milling stage by said pump, the fine fraction discharged from the classification stage is conducted to a receptacle and the contents of the receptacle are aspirated to a blending stage intermediate the milling stage and the pump to be recycled through the classification stage.

17. A method according to claim 1, in which the milled suspension discharged from the milling stage is pumped to the classification stage by a first pump intermediate the milling stage and the classification stage, the suspension is aspirated through the milling stage by the first pump, the fine fraction discharged by the classification stage is conducted to a receptacle and the contents of the receptacle are pumped by a second pump to a blending stage intermediate the first pump and the classification stage to be recycled therethrough.

18. A method according to claim 1, in which the slurry contains from 5 to 65% by weight of solid.

19. A method according to claim 18, in which the slurry contains from 35 to 50% by weight of solid.

20. A method as claimed in claim 1, in which a single classification stage is used.

21. A method as claimed in claim 1, in which a single milling stage is used.

22. A method according to claim 1, in which the milled suspension is subjected to ion exchange to reduce the content of any soluble ionic species therein.

23. A method according to claim 1, in which the milled suspension is subjected to ion exchange to reduce the content of any soluble soda therein.

24. A method according to claim 1, in which a viscosity modifier is added to the suspension in an amount of up to 10% by weight of the particles.

25. A method according to claim 1, in which the milled suspension is spray dried.

* * * * *